W. B. PEARSON & E. R. SEWARD.
ACTUATING MECHANISM.
APPLICATION FILED OCT. 20, 1908.
916,775.  Patented Mar. 30, 1909.
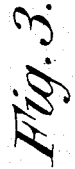
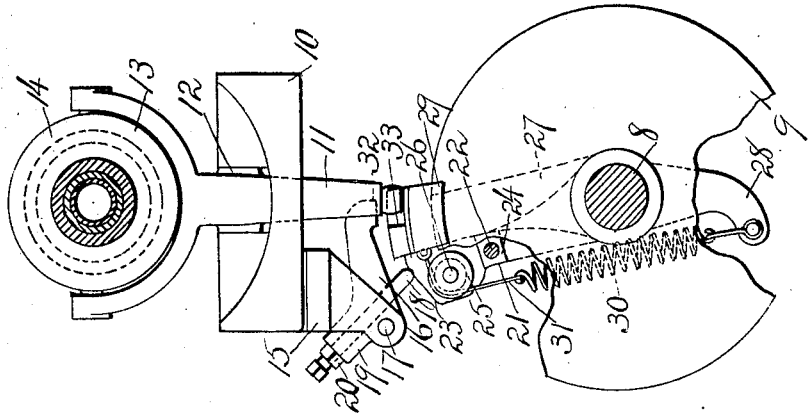
 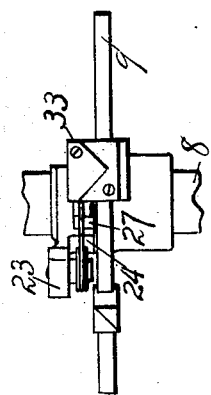  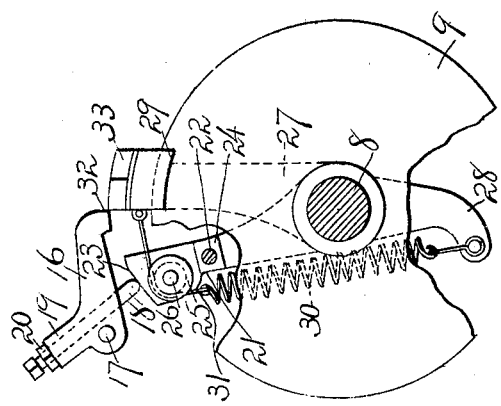
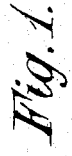 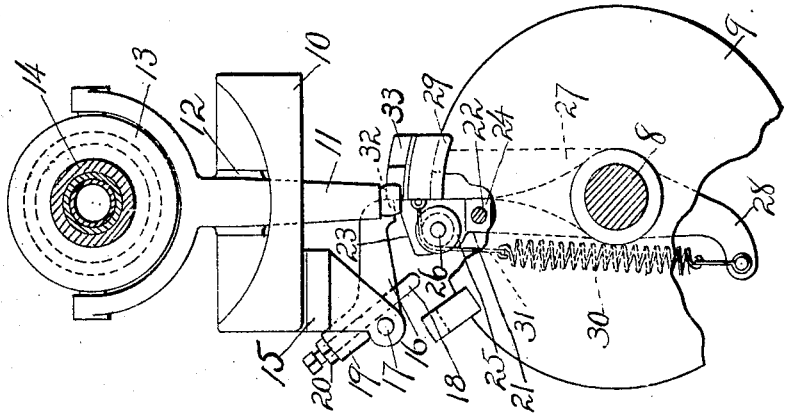
WITNESSES:
R. E. Berkovitz
A. Kreuendahl
INVENTORS
Walter B. Pearson
Ernest R. Seward
BY Arthur B. Jenkins
ATTORNEY.

UNITED STATES PATENT OFFICE.

WALTER B. PEARSON, OF CHICAGO, ILLINOIS, AND ERNEST R. SEWARD, OF HARTFORD, CONNECTICUT; SAID SEWARD ASSIGNOR TO THE HARTFORD MACHINE SCREW COMPANY, OF HARTFORD, CONNECTICUT, A CORPORATION OF CONNECTICUT.

ACTUATING MECHANISM.

No. 916,775.      Specification of Letters Patent.      Patented March 30, 1909.

Application filed October 20, 1908. Serial No. 458,739.

*To all whom it may concern:*

Be it known that we, WALTER B. PEARSON and ERNEST R. SEWARD, each a citizen of the United States, and residents, respectively, of Chicago, in the county of Cook and State of Illinois, and Hartford, in the county of Hartford and State of Connecticut, have invented a new and Improved Actuating Mechanism, of which the following is a specification.

Our invention relates to that class of mechanism by means of which the movement of one member or a number of members periodically actuates another member or a number of members, and the object of our invention is to provide a device of this class having numerous novel features of advantage and utility. A form of device in the use of which these objects may be attained is illustrated in the accompanying drawings, in which—

Figure 1 is a view in side elevation of our improved mechanism shown in one of its many adaptations and arranged to actuate a shipper mechanism, the parts being in position at the time of initial engagement of the lever cam with the trip. Fig. 2 is a similar view but showing the relative position of the parts at an advanced stage in the operation, a portion of the structure being omitted. Fig. 3 is a similar view but showing the parts just after disengagement of the lever cam and trip. Fig. 4 is a plan view of the parts shown in Fig. 2, the trip device being omitted.

Our invention is especially applicable in structures in which a sharp, quick, decisive movement of a part is required, or in which a blow is desirable to effect certain operations. The mechanism, while not limited in its use to any machine, is especially applicable in actuating the shipper mechanism of a screw or like automatic machine, and especially in operations of thread cutting, as movement is effected in so sharp and decisive a manner as to enable the exact point at which a threading die shall terminate its work upon a rod of stock to be nicely determined. For this reason we have adopted such mechanism as a means of illustrating our invention, only so much of the machine, however, as is necessary to a thorough understanding of the invention being illustrated.

In the accompanying drawings the numeral 8 indicates the cam shaft of a screw machine to which a cam disk 9 is secured.

The numeral 10 indicates the spindle base on which a shipper lever 11 is pivoted as at 12. The upper end of this lever is forked in the usual manner and engages the reciprocating member 13 of a friction clutch. The other parts of the clutch are omitted from the drawings, and a description of certain parts of the spindle mechanism omitted as their construction and operation will be readily understood by those skilled in the art, it being understood that a movement of the member 13 on its supporting spindle 14 frictionally unites the other clutch member or members with said spindle to impart variable motion thereto, said other clutch members being continuously rotatable during operation of the machine loosely upon the spindle, the member 13 being splined thereto.

A bracket 15 is secured to the under side of the spindle base 10 or other part of the machine frame, and in this bracket a trip 16 is mounted on a pivot 17. A contact 18 is secured to the trip, in the form of construction herein shown this contact consisting of a trip screw adjustably located in a projection 19 on the trip and having a threaded opening through which said contact or screw projects. This screw may be locked in any position of adjustment by means of a lock nut 20 abutting against the end of the projection 19. A trip operating lever 21 is mounted on the shaft 8 and is arranged to rotate with the disk 9. This result may be effected in various ways. In the form of construction herein shown said lever is loosely mounted on the shaft 8, being secured near the outer edge of the disk as by means of a set screw 22. The lever projects beyond the edge of the disk 9 and has a trip cam 23 located preferably on its outer end and in position to engage the contact 18. A stop 24 is formed on this lever to arrest the movement of a lever cam to be hereinafter described, in the form of construction herein shown the set screw 22 passing into said stop. A tensioning sheave 25 is mounted upon a stud 26 on the lever 21, that has an extension or spring arm 28.

An actuator lever 27 is loosely mounted on the shaft 8. This lever extends radially of the disk 9 beyond the edge thereof and has a lip 29 lying upon the opposite side of the disk 9 from the main part of the lever, this lip forming a recess within which the edge of the disk is located. A spring 30 is secured at one end to the arm 28, the opposite end of the spring being secured to one end of a flexible connection 31, the opposite end of the connection being secured to the actuator lever 27.

The end of the trip is formed into a trip nose 32 adapted to engage the lever 27, preferably at its front edge near its end. A cam 33 on the end of this lever is by choice a separate piece secured to the end of the lever, although other constructions may be employed. In the form herein shown this cam is made reversible so that it may operate the actuated device in either direction, it only being necessary to reverse the cam end for end, the same screws being utilized to secure it in place in either position, and the end of the lever being grooved to receive a tongue from the under surface of the cam.

In the operation of the device the disk 9 being rotated the lever 21 is carried thereby and the actuator lever 27 being held by the spring 30 against the stop 24, both levers move simultaneously until the edge of the cam 33 striking the nose 32 of the trip 16, the actuator lever is temporarily held from movement. As the disk continues to rotate, carrying with it the lever 21, the tension of the spring 30 is increased, as shown in Fig. 2 of the drawings, exerting a strong pull upon the actuator lever. In this movement of the lever 21 the cam face 23 encounters the contact screw 18, thus gradually lifting the trip until the edge of the cam 33 is disengaged from the nose 32, when the actuator lever 27 moves rapidly until it encounters the stop 24. In this movement the cam 33 encounters the end of the lever 11, giving to this lever a sharp, quick, decisive movement which is extremely efficient to operate the clutch mechanism in the action of the machine in cutting a screw thread.

While we have shown and described herein the preferred form of mechanism for carrying our invention into effect, it will be understood that we do not limit ourselves to this exact form as the construction shown may be departed from to a greater or less extent and yet embody the invention.

We claim—

1. A trip operating member movable in a single direction, a member yieldingly movable relative thereto, means for moving said members in the same direction, means for moving the yieldingly movable member relatively to the trip operating member, a trip to obstruct the movement of the yieldingly movable member, said trip being released from the yieldingly movable member by the trip operating member, and a member adapted to receive the force transmitted by the yieldingly movable member.

2. A trip operating member, a yieldingly movable member movable in a single direction, means for moving said members, means for exerting force upon the yieldingly movable member, a trip to obstruct the movement of the yieldingly movable member, said trip being released from said member by the trip operating member, and a member adapted to receive the force transmitted by the yieldingly movable member.

3. A trip operating member movable in a single direction, a yieldingly movable member, means for simultaneously moving said members, means for exerting force upon said yieldingly movable member, a trip to obstruct the movement of the yieldingly movable member, said trip being released from said yieldingly movable member by the trip operating member, and a member adapted to receive force transmitted by the yieldingly movable member.

4. A trip operating member movable in a curved path, a yieldingly movable member, means for moving said members, means for exerting force upon said yieldingly movable member, a trip to obstruct the movement of the yieldingly movable member, said trip being released from said yieldingly movable member by the trip operating member, and a member adapted to receive force transmitted by the yieldingly movable member.

5. A tripping member movable in a curved path, a member yieldingly retained against a stop and movable in a curved path, means for moving said members, means for exerting force upon said yieldingly retained member, a trip to obstruct the movement of the yieldingly retained member, said trip being released from said yieldingly retained member by the tripping member, and a member adapted to receive force transmitted by the yieldingly retained member.

6. A rotatable member having a tripping member yieldingly retained against a stop, means for moving said members, means for exerting force upon said yieldingly retained member, means for obstructing the movement of said yieldingly retained member, a device for automatically releasing the obstructing means from the yieldingly retained member, and a member adapted to receive force transmitted by the yieldingly retained member.

7. A rotatable member having a tripping device, a member yieldingly retained against a stop, means for moving said members, means for exerting force upon said yieldingly retained member, a trip to obstruct the movement of the yieldingly retained member, said trip being released from the yieldingly retained member by the tripping device, and a member adapted to receive force transmitted by the yieldingly retained member.

8. A rotatable member having a tripping device, a member yieldingly supported and movable about a pivotal point, means for moving said member, means for exerting force upon said yieldingly supported member, means for obstructing the movement of the yieldingly supported member, a device for automatically releasing the obstructing means from the yieldingly supported member, and a member adapted to receive force transmitted by the yieldingly supported member.

9. A trip member movable in a single direction, a member yieldingly retained against a stop, means for moving said members, means for exerting force upon said yieldingly retained member, means for automatically obstructing the movement of the yieldingly retained member and arranged to be disengaged therefrom by the tripping member, and an actuated member adapted to be interposed in the path of movement of the yieldingly retained member and to be operated thereby.

10. A tripping member and a yieldingly supported member movable about the same pivotal point, means for moving said members, means for exerting force upon the yieldingly supported member, a device to obstruct the movement of the yieldingly supported member, means for automatically releasing said obstructing device from the yieldingly supported member, and a member adapted to receive the force transmitted by the yieldingly supported member.

11. A tripping member and a yieldingly supported member, means for simultaneously moving both of said parts, means for exerting force upon the yieldingly supported member, a device to obstruct the movement of the yieldingly supported member, means for automatically releasing said obstructing device from the yieldingly supported member, and a member adapted to receive the force transmitted by the yieldingly supported member.

12. A tripping member and a yieldingly supported member movable about the same pivotal point, means for simultaneously moving both of said members, means for exerting force upon the yieldingly supported member, a device to obstruct the movement of the yieldingly supported member, means for automatically releasing said obstructing device from the yieldingly supported member, and a member adapted to receive the force transmitted by the yieldingly supported member.

13. A tripping member and a yieldingly supported member movable about the same pivotal point, means for simultaneously moving both of said members, means for exerting force upon the yieldingly supported member, a device to obstruct the movement of the yieldingly supported member, means for automatically releasing said obstructing device, and an actuated member adapted to be interposed in the path of the yieldingly supported member to be moved out of said path by the movement of said member.

14. A rotatable member having a tripping device, a member yieldingly supported upon the rotating member and movable therewith, means for holding the yieldingly supported member normally in one position on the rotating member, means for obstructing the movement of the yieldingly supported member, means for automatically releasing the obstructing device from the yieldingly supported member, and a member adapted to be actuated by the yieldingly supported member.

15. A rotatable member having a tripping device, an actuating member movable upon the pivot of the rotating member, means for holding the actuating member in a predetermined position with respect to the rotating member, means for rotating said members, a trip to obstruct the movement of the actuating member, means for automatically releasing the trip from the actuating member, and a member adapted to be operated by the actuating member.

16. A disk having a tripping device at its edge, means for rotating the disk, an actuating lever pivoted on the disk, means for holding the actuating lever in contact with the tripping device, a trip to obstruct the movement of the actuating lever and arranged to be released by said tripping device, and an actuated member arranged to be operated by the actuating member.

17. A disk having a tripping device at its edge, an actuating lever pivotally mounted with respect to the disk and having a lip engaging the edge thereof, means for operating the disk and actuating lever, a trip to obstruct the movement of the actuating lever and arranged to be released by said tripping device, and an actuated member adapted to be operated by said lever.

18. A rotating member having a tripping device, an actuating lever pivotally mounted with respect to the rotating member and having an actuating cam, means for moving the rotating member and actuating lever, means for holding the actuating lever in a predetermined position, means for obstructing the movement of the actuating lever and arranged to be released by said tripping device, and an actuated member interposed in the path of movement of said cam.

19. A rotating disk, having a tripping device, means for rotating the disk, an actuating lever pivotally supported with respect to the disk and movable therewith, means for holding the actuating lever against the tripping device, a trip to obstruct the movement of the actuating lever and arranged to be operated by the tripping device, and an actuated device adapted to be interposed in the path of movement of the actuating lever.

20. A rotating disk having a tripping device, means for rotating the disk, an actuating lever pivotally supported with respect to the disk and movable therewith, means for holding the actuating lever in contact with the tripping device, a cam upon the end of the actuating lever, a trip to obstruct the movement of the actuating lever and arranged to be actuated by the tripping device, and an actuated member located in the path of movement of said cam.

21. A disk rotatably mounted, means for rotating the disk, an actuating lever pivotally supported by the disk and movable therewith, a cam removably secured to the end of the lever, a trip device to obstruct the movement of said lever and arranged to be actuated by the tripping device, and an actuated member located in the path of movement of said cam.

22. A trip operating member movable in a forward direction only, a yieldingly movable member supported relatively thereto, means for moving said members in a forward direction only, a trip to obstruct the movement of the yieldingly supported member, means for exerting force upon the yieldingly supported member, said trip being arranged to be released by the trip operating member, and a member arranged to receive the force transmitted by the yieldingly supported member.

23. A trip operating member and a yieldingly movable member supported relatively each to the other, means for revolving said members, means for exerting force upon the yieldingly movable member, a trip to obstruct the movement of the yieldingly movable member, means for automatically releasing said trip from the yieldingly movable member in each revolution of said members, and a member arranged to receive the force transmitted by the yieldingly supported member.

24. A rotating disk, a tripping member pivotally mounted with respect to the disk, a yieldingly movable member pivotally mounted with respect to the disk, said members being revolved by the disk, means for exerting force upon the yieldingly movable member, a trip to obstruct the movement of the yieldingly supported member, said trip being arranged to be released by said trip operating member, and a member adapted to receive the force transmitted by the yieldingly supported member.

25. A rotatable member with means for rotating it, a tripping device secured thereto, an actuating lever pivotally mounted with respect thereto, means for exerting force upon said lever, means for moving said tripping device and lever in unison, a trip to hold the actuating lever against movement, said trip being arranged to be released from the actuating lever by the movement of the tripping device, and a member arranged to receive the force transmitted by the yieldingly supported member.

WALTER B. PEARSON.
ERNEST R. SEWARD.

Witnesses for Walter B. Pearson:
L. V. BAIN,
W. E. COOPER.

Witnesses for Ernest R. Seward:
ARTHUR B. JENKINS,
ELIZABETH G. EGAN.